United States Patent [19]
Gustafsson et al.

[11] 3,796,088
[45] Mar. 12, 1974

[54] METHOD AND DEVICE FOR MEASURING THE VISCOSITY OF A LIQUID OR THE CONCENTRATION OF SOLID MATTER SUSPENDED IN A LIQUID

[75] Inventors: Berth Ulrik Gustafsson, Osterskar; Erik Gunnar Attebo, Saffle, both of Sweden

[73] Assignee: Projectus Industriprodukter Aktiebolag, Stockholm, Sweden

[22] Filed: Mar. 29, 1972

[21] Appl. No.: 239,077

[30] Foreign Application Priority Data
Dec. 1, 1971    Sweden............................ 15413/71

[52] U.S. Cl. ........................... 73/59, 73/61 R
[51] Int. Cl. ............................. G01n 11/16
[58] Field of Search............... 73/59, 54, 61 R, 32 A

[56] References Cited
UNITED STATES PATENTS

| | | | |
|---|---|---|---|
| 2,696,735 | 12/1954 | Woodward | 73/59 |
| 2,819,610 | 1/1958 | White, Jr. | 73/59 |
| 2,973,639 | 3/1961 | Banks | 73/54 |
| 3,145,559 | 8/1964 | Banks | 73/59 X |
| 3,282,084 | 11/1966 | Banks | 73/59 X |
| 3,382,706 | 5/1968 | Fitzgerald et al. | 73/54 X |
| 3,426,593 | 2/1969 | Jacobs | 73/32 A UX |

FOREIGN PATENTS OR APPLICATIONS

| | | | |
|---|---|---|---|
| 1,311,330 | 10/1962 | France | 73/54 |
| 851,621 | 10/1960 | Great Britain | 73/54 |
| 153,142 | 3/1962 | U.S.S.R. | 73/54 |

Primary Examiner—Richard C. Queisser
Assistant Examiner—Joseph W. Roskos
Attorney, Agent, or Firm—Toren, McGeady and Stanger

[57] ABSTRACT

The viscosity of a liquid or the concentration of solid matter suspended in a liquid is measured by determining the damping of a vibrating measuring body introduced in the liquid or the suspension, the body vibrating at resonance frequency. In a first embodiment the body is vibrated with constant vibration amplitude and the energy supplied is measured. In a second embodiment the body is vibrated with constant energy supplied and the vibration amplitude is measured.

37 Claims, 10 Drawing Figures

Fig. 8

METHOD AND DEVICE FOR MEASURING THE VISCOSITY OF A LIQUID OR THE CONCENTRATION OF SOLID MATTER SUSPENDED IN A LIQUID

The present invention relates to measuring the viscosity of a liquid or the concentration of solid matter suspended in a liquid. The invention is particularly suitable for use in measuring the concentration of pulp fibres in flowing water.

Known methods of measuring the concentration of pulp fibres in water have many limitations and drawbacks, such as a small measuring range, poor accuracy and sensitivity for variations in pressure and flow speed when the measurement is performed on a suspension flowing in a pipe, for example.

The object of the present invention is to present a new method and a new device for performing measurements of the type mentioned in the introduction, whereby the imitations and drawbacks mentioned above are eliminated. Another object is to provide a method and a device of the type mentioned, which are not influenced to any great extent by external disturbances such as vibrations of the piping or the vessel where the measurement is taking place.

The above aims are achieved by the method and device according to the invention being given the characteristics defined in the accompanying claims.

In the following the invention will be further described with reference to the accompanying drawings.

Figure 3:
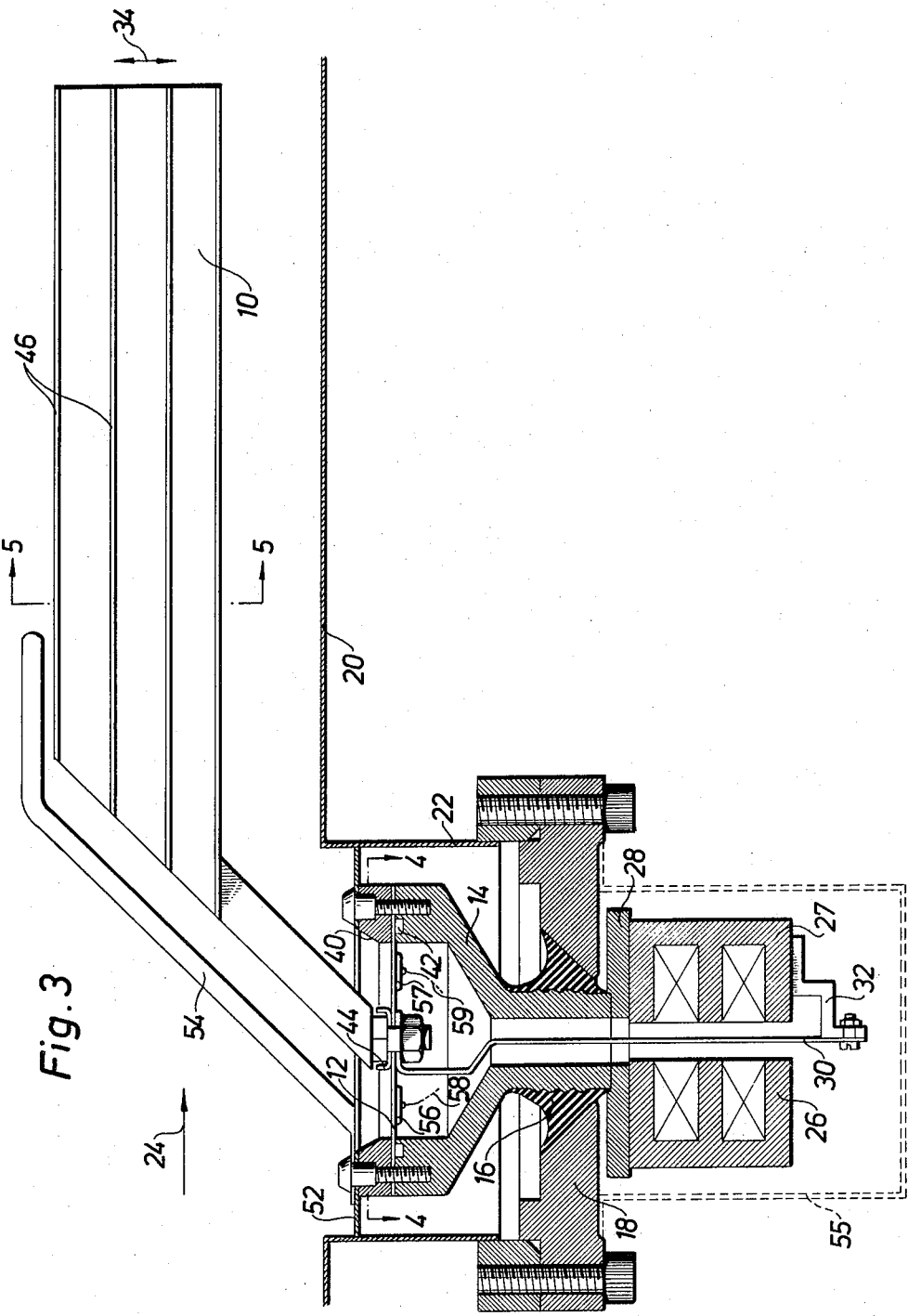
FIG. 3 shows partly in section a device constructed in accordance with the present invention and mounted in a pipe.
Figure 4:
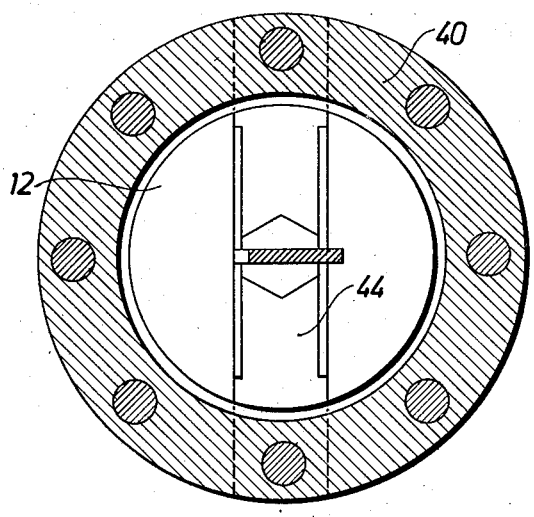
Figure 5:
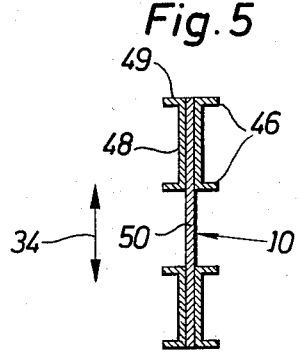

FIG. 4 and 5 show sections taken along the lines 4 — 4 and 5 — 5 in FIG. 3.

Figure 6:
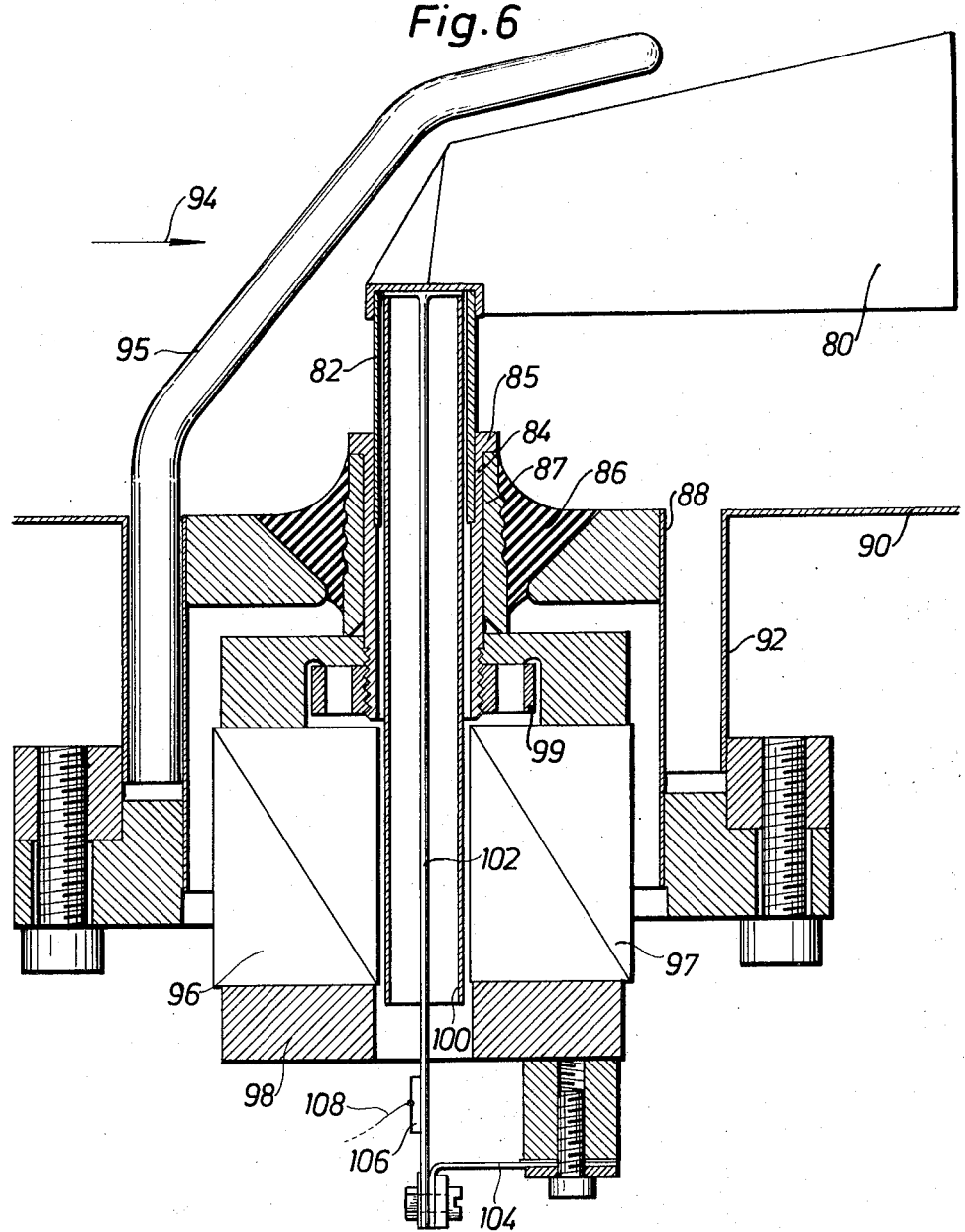
Figure 7:
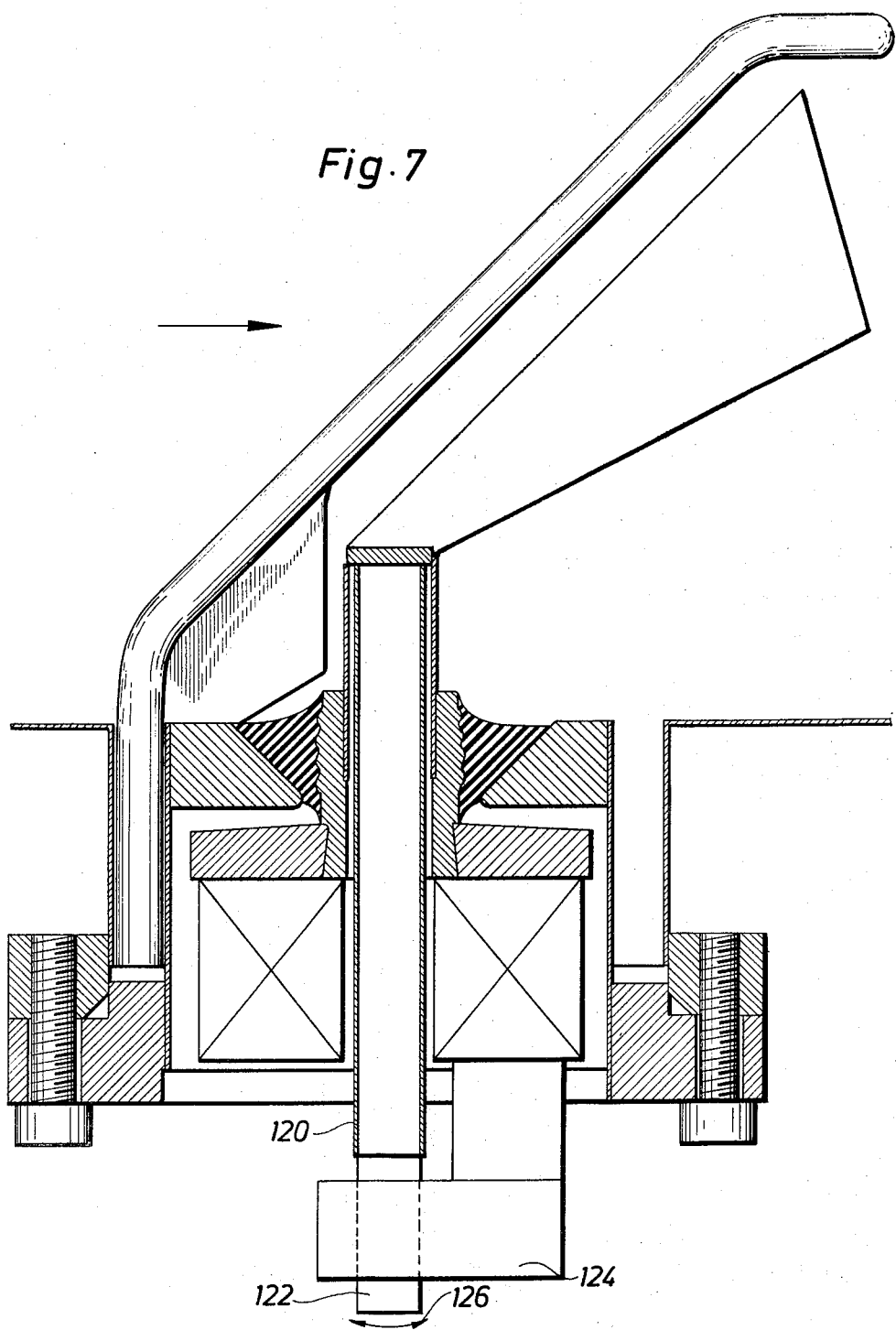

FIG. 6 and 7 show partly in section alternative embodiments of a device constructed in accordance with the invention.

Figure 8:
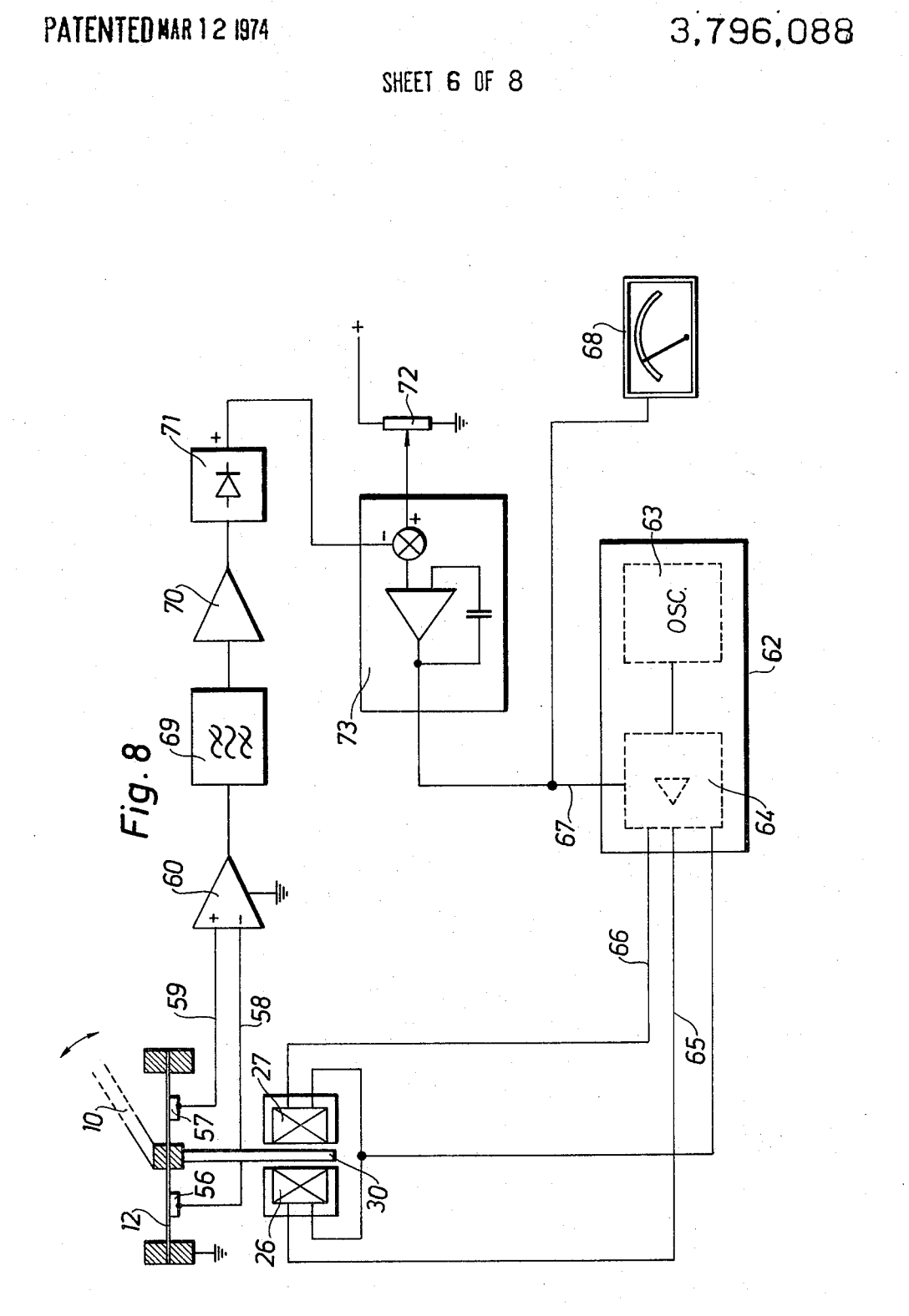
Figure 9:
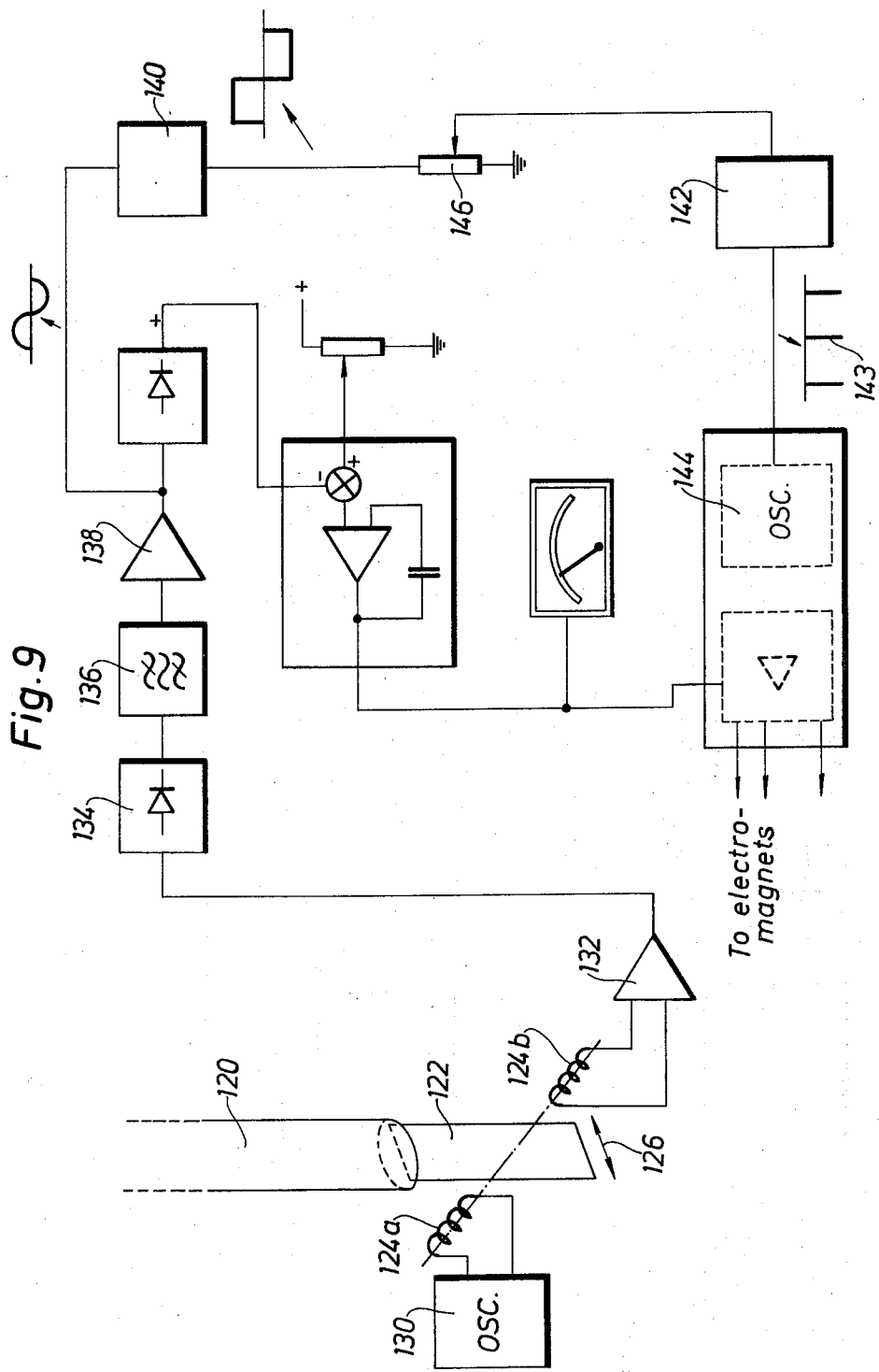
Figure 10:
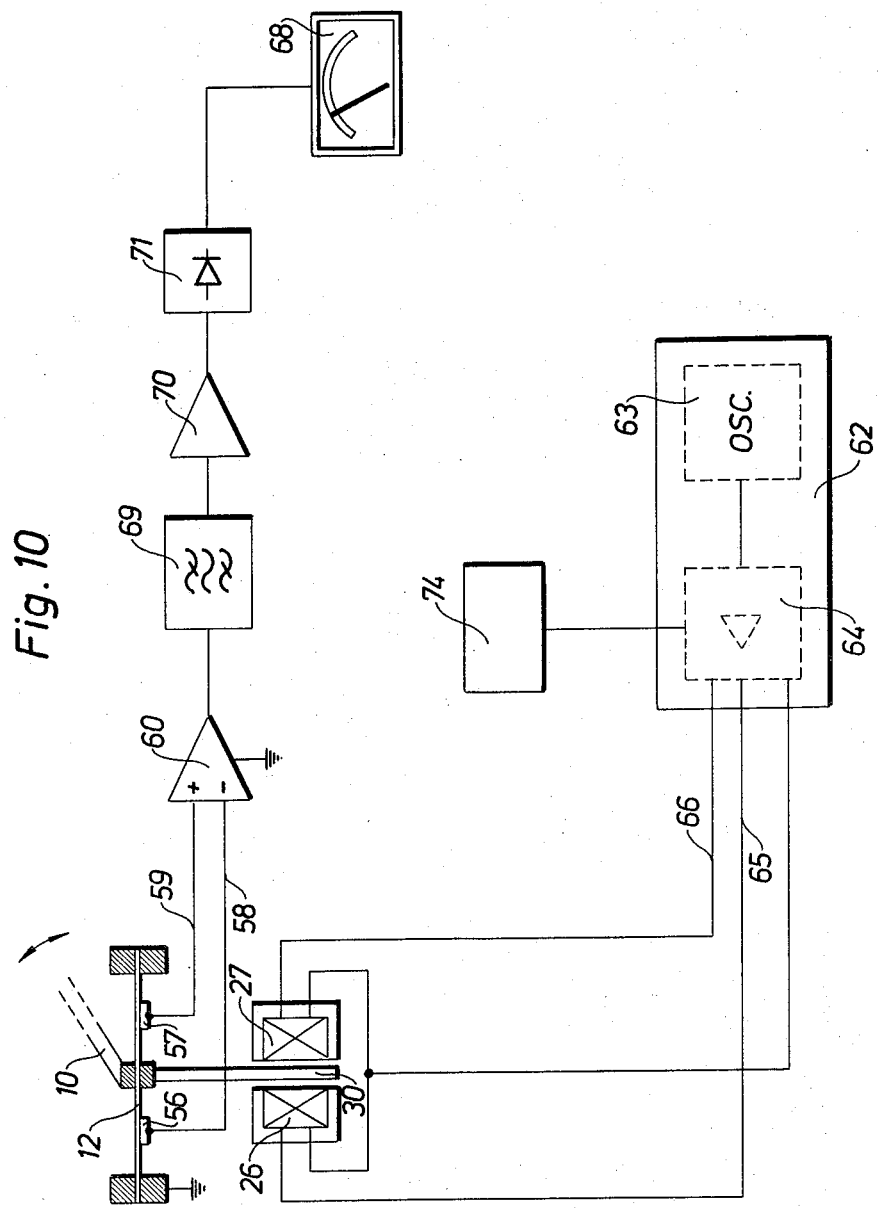

FIG. 8 and 9 and 10 show combined circuit and block diagrams of possible operating circuits included in a device according to the invention.

The invention is based on the principle that a measuring body which is vibrated in a liquid or a suspension will be subjected to a damping force which varies depending on the viscosity of the liquid or the concentration of solid particles in the suspension. Thus, by determining the damping in each individual case it is possible to calculate the viscosity or concentration sought.

Figure 1:
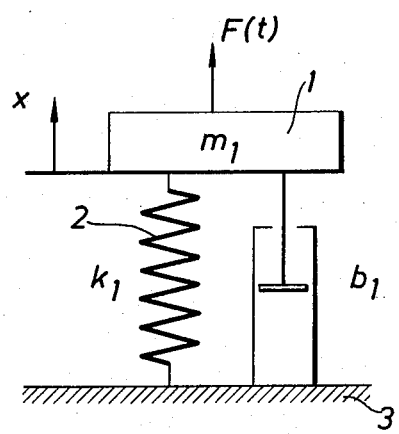
FIG. 1 and 2 show mechanical oscillatory system illustrating the basic principles of the present invention.

As illustrated in FIG. 1, according to the invention a measuring body 1 having a mass $m_1$ is inserted in the liquid or suspension, the body being spring-suspended by a spring member 2 with spring constant $k_1$ and being subjected in the liquid or the suspension to viscous damping with a damping coefficient $b_1$, is vibrated in the direction of $x$ with the help of a force $F(t)$ supplied externally. If the force varies sinusoidally so that $F(t) = f_o \sin \omega t$ it appears that the absolute value of the ratio between the vibration amplitude and the force - called in the following amplification - varies for different damping conditions. At and in the immediate vicinity of the resonance frequency of the measuring body $\omega_1 = \sqrt{k_1/m_1}$, the mass $m_1$ being presumed also to include that part of the liquid or suspension which is drawn into the oscillatory movement and which should be as little as possible, the amplification will be very dependent on the damping. If, therefore, the measuring body is brought to vibrate constantly with its resonance frequency and with constant amplitude then the force required, i.e., the energy supplied, will vary markedly depending on the damping and thus also depending on the viscosity of the liquid or the concentration of solid matter in the suspension. The measurement of the energy supplied therefore gives a measurement of the viscosity or concentration sought. It is of course also possible to vibrate the measuring body with its resonance frequency and constant energy supplied and then measure the vibration amplitude which is then a measurement of the viscosity or concentration sought. However, it would seem that the first alternative is to be preferred and the invention will therefore in the following be described more closely with respect to this alternative.

For the preferred measurement in accordance with the present invention, therefore, the measuring body is inserted in the liquid or suspension to be examined, after which the measuring body is vibrated with a constant, predetermined amplitude, for example electromagnetically. The resonance frequency is sought, for example, by varying the frequency and output level of the source of energy used, while retaining the constant amplitude, until a position has been reached with minimum for the energy supplied. In this position at least approximate resonance prevails. The minimum amount of energy supplied now provides a measurement of the viscosity or concentration sought.

The vibration amplitude of the measuring body can be determined by sensing the position of an arbitrary representative portion of the measuring body 1 or the spring member 2 or by sensing the strain state in some part of the spring member. This position sensing may be performed capacitively or magnetically, for example, in the latter case for instance by a member connected to the measuring body being permitted to disturb a high frequency magnetic field, the disturbances then being detected. Sensing of a strain state may be performed, for example, by means of piezo electric transducers or wire strain gauges.

In order to acquire an accurate measuring result it is, as intimated, essential that the measuring body is constructed in such a way and brought to vibrate so that the least possible quantity of liquid or suspension is drawn into the oscillatory movement. The measuring body should therefore suitably include at least one thin disc or flag and be brought to vibrate in a plane which is substantially parallel to a main plane of the measuring body, i.e., usually parallel with its two main limiting surfaces. When measuring the viscosity of a liquid, therefore, the damping will be mainly due to the shearing forces operating on the main limiting surfaces.

When measuring the concentration of solid particles or substance in a liquid it is essential that the measuring body is mostly dampened by friction against the particles and does not only push away these particles during its oscillatory movement and then only measures the viscosity of the liquid remaining around the measuring body. According to the invention therefore, the measuring body is shaped having a plurality of edges interrupting or breaking the boundary layer around the measuring body, these edges running substantially perpendicular to the direction of vibration. When the measurement is being performed in a flowing suspension, the edges run preferably substantially parallel to the direction of flow. The edges should be arranged as far away from the fulcrum of the measuring body as possible in order to obtain the greatest possible damping moment.

Characteristic of the invention is also that the resonance frequency is kept relatively low and that the vibration amplitude is chosen relatively large. Thus, the resonance frequency should not exceed one or a few kHz and the greatest amplitude of the measuring body should be in the order of 1 millimeter. Particularly when a suspension containing pulp fibres is being measured, the resonance frequency should be between about 100 and 1,000 Hz, preferably about 700 Hz, so that the viscosity of the liquid phase is of little importance in comparison with the action of suspended particles.

One requisite for accurate measuring results in accordance with what has been stated above is that the spring 2 in FIG. 1 is attached in a firm base or attachment 3 in relation to which the amplitude measurement can be performed. However, particularly in industrial applications it cannot always be guaranteed that the base 3 is completely stationary, particularly not if this consists of a pipe which may transmit vibrations from other machines and which may even be affected by the forces from the means used to vibrate the measuring body.

Figure 2:
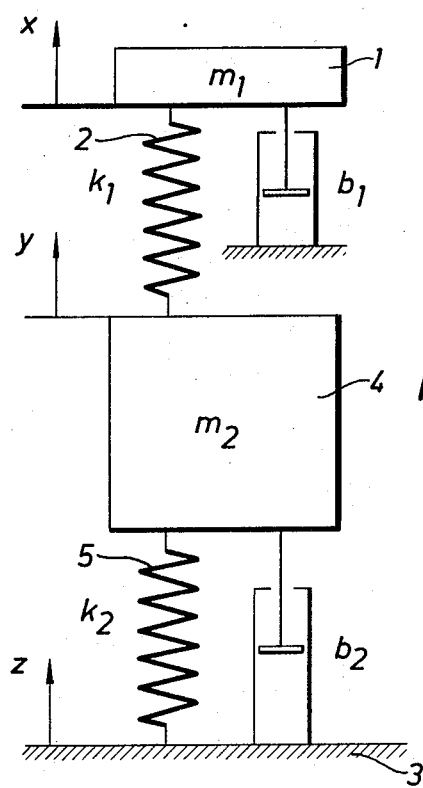

According to the present invention these problems can be eliminated in the manner illustrated by the mechanical oscillatory system shown in FIG. 2. Here the measuring body 1 is suspended by means of the spring 2 on a supporting member 4 having a mass $m_2$ and being spring-suspended on the base or attachment 3 with the help of a spring 5 having a spring constant $k_2$. The movement $y$ of the supporting member 4 is dampened viscously by the damping constant $b_2$. The means for vibrating the measuring body (not shown) is attached to the supporting member 4.

If the supporting member 4 is suspended so that the resonance frequency $\omega_2 = \sqrt{k_2/m_2}$ of the supporting member is considerably lower than the resonance frequency $\omega_1$, the supporting member may in practice be considered as stationary even if there are external disturbances 2, and the amplification is only dependent on the suspension of the measuring body 1. However, external frequencies in the vicinity of $\omega_2$ may give a reading on the amplitude measurement. $\omega_2$ should therefore be as low as possible, typically in the order of 1 Hz. The influence of external disturbances may also be reduced by using filters when producing a signal representing the magnitude of the vibration amplitude. These filters may comprise both band pass filters for frequencies of the amplitude signal corresponding to the supplied signal causing the vibration and also blocking filters for frequencies of the amplitude signal corresponding to external disturbances of frequencies in the vicinity of the resonance frequency of the supporting member.

FIG. 3 shows an embodiment of a device according to the invention which is constructed in accordance with the principle shown in FIG. 2. The device comprises a measuring body 10 which is suspended by means of a membrane 12 in a supporting member 14. The supporting member 14 is in turn suspended in an attachement member 18 by means of a rubber ring 16 which gives both resilience and damping. In the example shown a measuring body 10 is arranged to measure the concentration of solid particles in a suspension flowing in a pipe 20, the attachment member 18 being mounted on a pipe connection 22. As can be seen, the rubber ring 16 then also provides a seal between the suspension flowing under pressure in the pipe 20 in the direction of the arrow 24, and the surrounding atmosphere.

Two electromagnets 26, 27 are used to agitate the measuring body, the magnets being fitted on a plate 28 attached to the supporting member 14 and alternately influencing the measuring body 10 by way of an activating member 30. This consists of a magnetically actuated metal strip, one end of which is connected to the measuring body 10 where this is connected to the membrane 12 and the other end of which is connected to a support 32 mounted on the electro-magnet 27. If the electro-magnets are alternately energized, therefore, the measuring body 10 will vibrate as illustrated by the double arrow 34, i.e., the measuring body will oscillate in the plane of the paper.

The measuring body 10 is attached in the centre of the circular membrane 12 by means of a screw joint. Along its circumference the membrane 12 is clamped to the supporting member 14 with the help of a clamping ring 40. A seal 42 ensures that the suspension cannot leak out to the other side of the membrane. A stiffening element 44 in the form of a U-beam is arranged on the membrane 12 so that the measuring body 10 can only vibrate in one specific plane. The two ends of the U-beam are flat and clamped in recesses in the ring 40, as can be seen in FIG. 4.

The measuring body 10 is flag-shaped and provided with a plurality of longitudinally extending projecting edges 46 which make the measuring body particularly suitable for measuring the concentration of pulp fibres in water. The edges 46, which are obtained by arranging U elements 48 with flanges 49 on the disc-shaped main part 50 of the measuring body 10, see FIG. 5 penetrate or project through the boundary layer surrounding the measuring body and provide damping effect by friction against the pulp fibres, as well as preventing pure liquid, i.e., water, from collecting around the measuring body, which would mean that only the viscosity of the liquid phase would be determined.

On the clamping ring 40 a sealing ring 52 of rubber and a shock absorber or protective means 54 for the measuring body 10 are arranged. The shock absorber 54 may be plough-shaped and is intended to deflect collections of pulp fibres, for example, from the measuring body. As indicated by the broken lines at 55, the electro-magnets may be enclosed in a suitably arranged cover inside which a connection terminal board (not shown) for the necessary electric cables may be arranged.

In order to measure the vibration amplitude of the measuring body 10 a pair of piezoelectric strain sensitive transducers 56, 57 are adhered to the back of the membrane 12. The transducers are arranged symmetrically with respect to the attachment of the measuring body 1o in 10 membrane and when the measuring body is oscillating will therefore give signals of equal magnitude but opposite polarity. As will be further explained later on the transducers 56, 57 are connected via conductors 58, 59, to an amplifier (60 in FIG. 8) having two inputs which are so arranged that voltages having opposite polarity are added and voltages having the same polarity cancel each other. Thus pressure pulsations in the liquid or suspension will not affect the amplitude measurement.

FIG. 8 shows an embodiment of a circuit for agitating the measuring body 10 according to FIG. 3 with constant vibration amplitude. The measuring body 10, membrane 12, actuating member 30 and electromagnets 26, 27 are here shown in simplified form. In order to feed the electro-magnets 26, 27 a driving source 62 is used including an oscillator 63 having variable output frequency and a output amplifier 64 having two push-pull connected outputs which by way of conductors 65, 66 feed respective electro-magnets 26 and 27. The output level from the output amplifier 64 depends on the feeding voltage in the cable 67. This voltage, which is thus a measurement of the energy supplied, can be read on an indicator 68.

As described above, the two piezoelectric transducers 56, 57 are connected to the inputs of the amplifier 60 by way of cables 58, 59. The output signal from the amplifier 60 is thus a signal having a main frequency equal to the frequency with which the electromagnets are fed and a magnitude depending on the vibration amplitude of the measuring body. The signal from the amplifier 60 is passed through a band pass filter 69 in which any frequency components deriving from disturbances are removed, and another amplifier 70, before being rectified in a rectifier 71. The direct voltage thus obtained is thus a measurement of the magnitude of the vibration amplitude. In order to keep the vibration amplitude constant, the direct voltage obtained, which constitutes a real value, is compared with a desired value set by means of a potentiometer 72 in a PI regulator 73, which gives the feeding voltage to the output amplifier 64. The PI regulator 73 will therefore alter the feeding voltage until the vibration amplitude and thus the direct voltage obtained from the rectifier 71 are correct. Assuming that the set frequency from the oscillator 63 agrees with the resonance frequency of the measuring body, the reading on the instrument 68 is now a measurement of the viscosity or concentration sought. For example, with a device according to FIG. 3 and 8 it has proved possible with one and the same measuring body to measure concentrations of pulp fibres in water of between 0.1 and 6–7 percent, the concentration being the percentage of dry substance. This means that almost the entire pumpable range is covered.

FIG. 6 shows an alternative embodiment of a device according to the invention mounted for taking measurements in a pipe. The measuring body 80, not shown here in closer detail, is spring-suspended in an outer steel tube 82, which is attached in a supporting member 84 in the form of a sleeve. The sleeve is suspended in an attachment member 88 by means of a a rubber ring 86 firmly vulcanised to the attachment member 88 and provided internally with a sleeve. The attachment member 88 is mounted on a pipe connection 92 arranged on the pipe 90. The flow direction is indicated by the arrow 94. A shock absorber 95 has also been arranged in front of the measuring body.

The electro-magnets 96, 97 to agitate the measuring body 80 are attached on an assembly member 98 which is kept on the lower part of the sleeve 84, which is provided with a screw-thread, with the help of a nut 99, so that at the same time the sleeve 87 on the rubber ring 86 is clamped against a flange 85 on the upper end of the sleeve 84. The nut 99 is provided with apertures for a tool with which to tighten it.

The measuring body is actuated with the help of an actuating member 100 in the form of an inner tube of soft iron coaxial with the outer tube, the upper end of the inner tube being attached to the measuring body and the lower end being influenced magnetically by the electromagnets 96, 97.

For the amplitude measurement a central weak rod 102 is used, the upper end of which is attached at the connection of the measuring body to the two tubes 82 and 100 and the lower end of which is attached to a support 104.

The strain variations arising in the rod 102 because of vibrations of the measuring body are detected with the help of a piezoelectric transducer 106 glued to the rod 102, this emitter being connected via a cable 108 to an amplifier. Apart from the fact that this amplifier need only have one input, an operating circuit of the type described in connection with FIG. 8 can also be used here.

FIG. 7 shows yet another alternative of the device according to the invention fitted for taking measurements in a pipe. The embodiment shown is constructed in substantially the same way as the embodiment shown in FIG. 6 and a more detailed description is therefore considered unnecessary. However, a completely different principle is used for measuring the amplitude, i.e., the influence of a vibrating metal tongue on a high frequency magnetic field. A metal tongue 122 is thus arranged on the lower, free end of the tubular actuating member 120 so that it is in the magnetic field between a primary and a secondary winding of a high frequency transformer 124. When the measuring body vibrates, therefore, the metal tongue 122 will also vibrate as indicated by the double arrow 126 and thus disturb the magnetic field in the high frequency transformer, giving rise to a detectable signal on its secondary side indicating the vibration amplitude of the measuring body, as will be seen more clearly in FIG. 9.

As is shown schematically in FIG. 9, the metal tongue 122 fitted on the tube 120 moves in the magnetic flux between a primary winding 124a and a secondary winding 124b in the high frequency transformer 124 (FIG. 7) and thus, to a varying extent, screens off the secondary side of the transformer from its primary side. The primary winding 124a is fed by a highly stable high frequency oscillator 130 with a frequency of, for example, between 100 and 400 kHz. The voltage induced in the secondary winding is amplified in an amplifier 132 and may then pass an amplitude detector 134. The signal thus obtained comprises a direct voltage component dependent on the basic position of the tongue between the primary and secondary sides of the transformer, an alternating voltage component with a frequency equal to twice the oscillator frequency and an alternating voltage component with a frequency equal to the vibration frequency of the measuring body and with an amplitude corresponding to the vibration amplitude of the measuring body. This latter signal component is filtered out with the help of a band pass filter 136 and amplified in an amplifier 138. The signal obtained in this way is then permitted to control the feeding of the electromagnets which vibrate the measuring body in the same way as described in connection with FIG. 8.

The mechanical resonance system used according to the present invention has an extremely accentuated resonance peak. It is therefore extremely important that the electro-magnets really are fed with the correct frequency and that possible fluctuations in the oscillator, the influence of temperature changes, etc., are compensated. Similarly it is desirable to achieve automatic adjustment of the resonance frequency if the device according to the invention is to be used for continuous measurement over a large measuring range within which the resonance frequency alters somewhat depending on the composition of the liquid or the suspension in which the measurement is being carried out. Such compensation and/or adjustment can be achieved by letting the oscillating system constitute a frequency-determining part of the driving oscillator, for example in the manner shown in FIG. 9. A signal representing the vibratory movement of the measuring body is taken out after the amplifier 138 and converted in an amplifier stage 140 to square shape. The square pulses obtained are fed to a differentiating stage 142 which gives synchronising pulses 143 which synchronise the oscillator 144 (the latter being a multivibrator) to the natural frequency of the system provided that the phase displacement in the synchronising loop is suitably chosen. Thus, the mechanical movement of the system produces synchronizing pulses.

The synchronising strength can be adjusted by means of the potentiometer 146. It is thus possible to limit the frequency range within which the frequency may be permitted to vary. The lowest frequency is determined by the basic setting of the multivibrator and the highest frequency to which the multivibrator can be synchronized is determined by the amplitude of the synchronizing signals, i.e., the position at which the potentiometer 146 is set.

Although the operating circuits shown in FIG. 8 and 9 are primarily designed for measuring in accordance with the first alternative, i.e., with constant vibration amplitude and measurement of the energy supplied, they are easily adapted for measuring according to the second alternative, i.e., with a constant supply of energy and measuring the vibration amplitude. In this case, for example, the PI regulator 73 is replaced by a voltage source having constant output voltage and the measuring instrument 68 is connected after the rectifier 71.

FIG. 10 illustrates how the circuit of FIG. 8 can be modified for measuring according to the second alternative, the constant output voltage source 74 being connected to the amplifier 64. Of course, also the circuit of FIG. 9 can be modified in the same way without affecting the function of the frequency control circuit 140–146.

We claim:

1. The method of measuring characteristics of a fluid, which comprises inserting a spring mounted vibratable measuring body into the fluid, vibrating the body at its resonant frequency relative to a spring mounted and damped mounting member whose mass and spring constant and damping coefficient give a resonant frequency that is less than and out of the range of the resonant frequency of the body, the step of vibrating the body including applying energy to the body so as to produce vibrations of the resonant frequency which vibrations have an amplitude, the energy applied and the amplitude of the vibrations each representing a condition of the operation, maintaining one of said conditions constant while measuring the other of said conditions as a measure of the characteristics of the fluid.

2. An apparatus for measuring characteristics of a fluid, comprising a supporting member, a measuring body, spring means for supporting said measuring body on said supporting member, said body being insertable in the fluid, said body and said spring means exhibiting a resonant frequency, an attachment member, support means for supporting said supporting member relative to said attachment member, said attachment member and said support means exhibiting a second resonant frequency less than and remote from the first resonant frequency, vibrating means for applying energy to the body and vibrating the body at its resonant frequency, said body exhibiting an amplitude when vibrated, the energy and the amplitude each representing a condition of operation during vibration of the body, control means forming a part of said vibrating means for maintaining one of said conditions constant during vibration of the body at its resonant frequency, and measuring means for measuring the other of the conditions during vibration of the body at the resonant frequency.

3. An apparatus as in claim 2, wherein said amplitude is maintained constant.

4. An apparatus for measuring the viscosity of a liquid or the concentration of solid matter suspended in a liquid, said apparatus comprising a supporting member, a measuring body spring supported on the supporting member and insertable in the liquid or suspension, an attachment member, said supporting member being spring-supported on the attachment member, the mass of the supporting member and the spring constant and damping coefficient of the suspension means being selected so that the resonant frequency of the supporting member is substantially less than the resonance frequency of the measuring body, operating means to bring the measuring body to vibrate with resonant frequency and with constant amplitude, and measuring means to measure the energy required to maintain the resonant frequency and the constant amplitude, the energy varying depending on the damping effect of the liquid or suspension on the vibrating measuring body and thus depending on the viscosity of the liquid or the concentration of solid matter.

5. An apparatus according to claim 4, wherein said operating means comprise electro-magnets mounted on the supporting member which vibrate the measuring body by magnetic action, an oscillator having variable frequency and variable output level to feed the electro-magnets, and means to measure the amplitude of the vibrations of the measuring body.

6. An apparatus according to claim 5, wherein the electro-magnets are arranged to affect the measuring body by way of an actuating member connected to the measuring body.

7. An apparatus according to claim 6, wherein the measuring body is spring-suspended on the supporting member by means of a first tube, one end of the tube being connected to the measuring body and the other end of the tube being attached in the supporting member.

8. An apparatus according to claim 7, wherein the actuating member includes a second tube arranged coaxially with the first tube, one end of the tube being connected to the measuring body and the other end of the tube being arranged to be magnetically actuated by the electro-magnets.

9. An apparatus according to claim 8, wherein said amplitude measuring means comprise at least one strain sensitive member arranged on a rod or the like, one end of which is connected to the second tube and the other end of which is connected to the supporting member.

10. An apparatus according to claim 9, wherein the strain sensitive member is a piezoelectric transducer.

11. An apparatus according to claim 8, wherein said amplitude measuring means comprise a metal tongue attached to the other end of the second tube, said tongue being arranged to screen off to a varying extent the magnetic flux between a primary winding and a secondary winding of a high frequency transformer mounted on said supporting means during vibration of the measuring body, and means to detect the signal component arising in the secondary winding as a result thereof.

12. An apparatus according to claim 4, wherein the measuring body comprises at least one flat-shaped main part and is arranged to vibrate in a plane substantially coinciding with a main plane for the main part.

13. An apparatus according to claim 4, wherein the measuring body has a plurality of projecting edges interrupting the boundary layer and running substantially perpendicular to the direction of vibration.

14. An apparatus according to claim 12, wherein said main part is provided with side flanges projecting substantially perpendicularly to said main part and extending substantially perpendicular to the direction of vibration.

15. An apparatus according to claim 4, wherein the greatest amplitude of the measuring body is in the order of 0.1 – 1 mm.

16. An apparatus according to claim 4, wherein the resonance frequency of the supporting member is in the order of a few periods per second, and the vibration frequency of the measuring body is between about 100 and 1000 periods per second.

17. An apparatus according to claim 5, wherein said amplitude measuring means generate a signal corresponding to the actual vibration amplitude, which signal is compared in a control circuit with a signal corresponding to the desired amplitude in order to generate a control signal which controls the signal level from the oscillator to the electro-magnets.

18. An apparatus according to claim 17, wherein control measuring means are provided for measuring the magnitude of the control signal in order to determine the quantity of energy supplied.

19. An apparatus according to claim 5, wherein said amplitude measuring means are connected to said oscillator over a feedback loop so that the measuring body constitutes a frequency determining part of said oscillator.

20. An apparatus for measuring the viscosity of a liquid or the concentration of solid matter suspended in a liquid, said apparatus comprising a supporting member, a measuring body spring-suspended on the supporting member and insertable in the liquid or suspension, an attachment member, said supporting member being spring-suspended on the attachment member, the mass of the supporting member and the spring constant and damping coefficient of the suspension means being selected so that the resonant frequency of the supporting member is considerably less than the resonant frequency of the measuring body, operating means to bring the measuring body to vibrate with resonance frequency with constant energy supplied, and measuring means to measure the vibration amplitude, the amplitude varying depending on the damping effect of the liquid or suspension on the vibrating measuring body and thus depending on the viscosity of the liquid or the concentration of solid matter.

21. An apparatus according to claim 20, wherein said operating means comprise electro-magnets mounted on the supporting member shich vibrate the measuring body by magnetiv action, and an oscillator having variable frequency and fixed output level to feed the electro-magnets.

22. An apparatus according to claim 21, wherein the electro-magnets are arranged to affect the measuring body by way of an actuating member connected to the measuring body.

23. An apparatus according to claim 22, wherein the measuring body is spring-suspended in the supporting member by means of a first tube, one end of the tube being connected to the measuring body and the other end of the tube being attached in the supporting member.

24. An apparatus according to claim 23, wherein the actuating member includes a second tube arranged coaxially with the first tube, one end of the tube being connected to the measuring body and the other end of the tube being arranged to be magnetically actuated by the electro-magnets.

25. An apparatus according to claim 24, wherein said amplitude measuring means comprise at least one strain sensitive member arranged on a rod or the like, one end of which is connected to said second tube and the other end of which is connected to the supporting member.

26. An apparatus according to claim 25, wherein the strain sensitive member is a piezoelectric transducer.

27. An apparatus according to claim 24, wherein said amplitude measuring means comprise a metal tongue attached to the other end of the second tube, said tongue being arranged to screen off to a varying extent the magnetic flux between a primary winding and a secondary winding of a high frequency transformer mounted on said supporting member during vibration of the measuring body, and means to detect the signal component arising in the secondary winding as a result thereof.

28. An apparatus according to claim 20, wherein the measuring body comprises at least one disc or flag-shaped main part and is arranged to vibrate in a plane substantially coinciding with a main plane for the main part.

29. An apparatus according to claim 20, wherein the measuring body has a plurality of projecting edges interrupting the boundary layer and running substantially perpendicular to the direction of vibration.

30. An apparatus according to claim 28, wherein said main part is provided with side flanges projecting substantially perpendicularly to said main part and running substantially perpendicular to the direction of vibration.

31. An apparatus according to claim 20, wherein the resonance frequency of the supporting member is in the order of a few periods per second and the vibration frequency of the measuring body is between about 100 and 1000 periods per second.

32. An apparatus for measuring the concentration of solid matter suspended in a liquid, said apparatus comprising a supporting member, a measuring body spring-suspended on the supporting member and insertable in the suspension, means to bring the measuring body to vibrate with resonant frequency and with constant amplitude, and measuring means to measure the energy required to maintain the resonance frequency and the constant amplitude, the energy varying depending on the concentration of solid matter, said measuring body having projections penetrating the suspension boundary layer around the measuring body to cause damping of the measuring body by friction against said solid matter, when the measuring body is vibrated.

33. An apparatus according to claim 32, wherein the measuring body has the shape of a thin plate having elongated side projections, said plate being vibrated in a plane substantially parallel to its side surfaces, said side projections running substantially perpendicularly to the direction of vibration.

34. An apparatus according to claim 33, wherein the greatest vibration amplitude of the measuring body is in the order of 0.1 – 1 mm.

35. An apparatus for measuring the concentration of solid matter suspended in a liquid, said apparatus comprising a measuring body spring-suspended in a supporting member and insertable in the suspension, operating means to bring the measuring body to vibrate with resonance frequency with constant energy supplied, and measuring means to measure the vibration amplitude, said amplitude varying depending on the concentration of solid matter, said measuring body being provided with projections penetrating the suspension boundary layer around the measuring body to cause damping of the measuring body by friction against said solid matter when the measuring body is vibrated.

36. An apparatus according to claim 35, wherein the measuring body has the shape of a thin plate having elongated said projections, said plate being vibrated in a plane substantially parallel to its side surfaces, said side projections running substantially perpendicularly to the direction of vibration.

37. An apparatus for measuring the concentration of solid matter suspended in a liquid, comprising a supporting member, a measuring body, spring means for supporting said measuring body on the supporting member, said body being insertable in the suspension, said body and said spring means together exhibiting a resonant frequency, vibrating means for applying energy to the body and causing the body to vibrate at the resonant frequency, said vibration of the body exhibiting an amplitude, the amplitude and the energy representing operating conditions during vibration, measuring means for maintaining one of said conditions constant in measuring the other of said conditions, said measuring body having projections prenetrating the suspension boundary layer around the measuring body to cause damping of the measuring body by friction against the solid matter when the measuring body is vibrated.

* * * * *